(12) United States Patent
Ishizaki (10) Patent No.: US 7,793,207 B2
(45) Date of Patent: Sep. 7, 2010

(54) CONVERTING TEXT DATA INTO BINARY DATA USING EXTERNAL LINK INFORMATION

(75) Inventor: Tooru Ishizaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 11/391,953

(22) Filed: Mar. 28, 2006

(65) Prior Publication Data
US 2006/0214707 A1    Sep. 28, 2006

(30) Foreign Application Priority Data
Mar. 28, 2005   (JP) ............... 2005-091856

(51) Int. Cl.
*G06F 17/00* (2006.01)
(52) U.S. Cl. .................... 715/201; 715/256
(58) Field of Classification Search ........... 715/256, 715/201
See application file for complete search history.

(56) References Cited

U.S. PATENT DOCUMENTS

| | | | | |
|---|---|---|---|---|
| 6,094,684 A * | 7/2000 | Pallmann | ............. | 709/227 |
| 6,701,524 B1 * | 3/2004 | Okamura et al. | ............. | 725/37 |
| 6,850,645 B2 * | 2/2005 | Naoi et al. | ............. | 382/190 |
| 6,879,988 B2 * | 4/2005 | Basin et al. | ............. | 707/200 |
| 6,912,314 B1 * | 6/2005 | Curry | ............. | 382/232 |
| 7,023,974 B1 * | 4/2006 | Brannam et al. | ............. | 379/93.24 |
| 7,178,100 B2 * | 2/2007 | Call | ............. | 715/210 |
| 7,230,735 B2 * | 6/2007 | Haugli | ............. | 358/1.15 |

FOREIGN PATENT DOCUMENTS

| | | |
|---|---|---|
| JP | 2000-148438 | 5/2000 |
| JP | B3610001 | 5/2002 |
| JP | 2003-108331 | 4/2003 |
| WO | WO 2005/101210 | 10/2005 |

OTHER PUBLICATIONS

Oqbuji, IBM DeveloperWorks Article, "Tip: Compress XML files for efficient transmission", published Apr. 2004, p. 1-4.*
Bayardo, et al., "An Evaluation of Binary XML Encoding Optimizations for Fast Stream Based XML Processing", published by ACM, WWW2004, May 2004, New York, USA, p. 1-10.*
Japanese Office Action dated Sep. 29, 2006 for the Japanese Patent Application No. 2005-091856 withouth English translation.

* cited by examiner

*Primary Examiner*—Amelia Rutledge
(74) *Attorney, Agent, or Firm*—Cowan, Liebowitz & Latman, P.C.

(57) ABSTRACT

An information processing apparatus and method for analyzing structured document data and outputting the analytical results in units of structure. The apparatus detects a specific character string indicating a first data form contained in the structured document data. When the specific character string is detected, data corresponding to this specific character string is converted to a second data form that is different from the first data form and the data of the second data form is stored.

6 Claims, 12 Drawing Sheets

```
<sample
      src="data:image/jpeg;base64,R01GODdhMAAwAPAAAAAAAP/
//ywAAAAAMAAwAAAC8lyPqcvt3wCcDkiLc7c0qwyGHhSWqjQu
5yqmCYsapyuvUUlvONmOZtfzgFzByTB10QgxOR0TqBQeihRNzO
fkVJ+5YiUqrXF5Y5lKh/DeuNcP5yLWGsEbtLiOSpa/TPg7JpJHxy
endzWTBfX0cxOnKPjgBzi4diiWGokF8kjdfnycQZXZeYGejmJiZeG
              ⋮
l9i2icVqaNVailT6F5iJ90m6mvuTS4OK05M0vDk0Q4XUtwvKOzrcd
3iq9uisF81M1OlcR71EewwcLp7tuNNkM3uNna3F2JQFo97Vriy/Xl4
/f1cf5VWzXyym7PHhhx4dbgYKAAA7">
      <title>sample image</title>
      <date>today</date>
</sample>
```

CHARACTER-STRING VS. EXTENSION CORRESPONDENCE TABLE

| ENTRY | EXTENSION |
|---|---|
| image/jpeg | jpg |
| image/png | png |
| ⋮ | ⋮ |

FIG. 9 sample type="image/jpeg">

R01GODdhMAAwAPAAAAAAAP/// ywAAAAMAAwAAAC8lyPqcvt3wCcDkiLc7c0qwyGHhSWqjQu5y qmCYsapyuvUUlvONmOZtfzgFzByTB10QgxOR0TqBQeihRNzOfkV J+5YiUqrXF5Y5!Kh/DeuNcP5yLWGsEbtLiOSpa/

TPg7JpJHxyendzWTBfX0cxOnKPjgBzi4diiWGokF8kjdfnycQZXZe

YGejmJIZeG

⋮

I9i2icVqaNVailT6F5iJ90m6mvuTS4OK05M0vDk0Q4XUtwvKOzrcd

3iq9uisF81M1OlcR71EewwcLp7tuNNkM3uNna3F2JQFo97Vriy/Xl4

/f1cf5VWzXyym7PHhhx4dbgYKAAA7

</sample>

CONVERTING TEXT DATA INTO BINARY DATA USING EXTERNAL LINK INFORMATION

FIELD OF THE INVENTION

This invention relates to an information processing apparatus and method for analyzing structured document data and outputting result of analysis in units of structure.

BACKGROUND OF THE INVENTION

In an information processing apparatus for analyzing a structured document data such as XML document data input thereto, a SAX parser, for example, analyzes the end elements of elements in XML document data and processes the analytical results at the moment analysis is concluded.

In the specification of Japanese Patent Application Laid-Open No. 2000-148438, a user is allowed to designate the element name of a constituent element, only the designated element is analyzed and the result of analysis is output.

If a large amount of data is contained in a document structure unit, which is the unit in which input document data is processed, the information processing apparatus will require a large amount of resources in order to process the document. For example, if XML document data is such that image data of large size has been embedded in an src attribute by a description "img src=", a large-capacity buffer will be required in order to store the state of the image data during the analysis thereof. If an independent interface for dealing with such a structured document is provided, there is the possibility that processing can be performed without requiring a large-capacity buffer. However, higher costs are entailed in order to have applications support such an arrangement.

SUMMARY OF THE INVENTION

Accordingly, an object of the present invention is to solve the problem of the prior art.

A feature of the present invention is to provide an information processing apparatus and method so adapted that input document data can be analyzed and output with few resources even if the input document data carries a large quantity of data in units of processing decided in advance.

According to the present invention, there is provided with an information processing apparatus for processing structured document data, comprising:

a reception unit configured to receive structured document data;

a character-string detection unit configured to detect a character string, which is indicative of data that has been described in text-data form that is a first data form, contained in the structured document data;

a data conversion unit configured to execute processing, in parallel with processing for receiving the structured document data, and to convert data read in following the character string, which has been detected by the character-string detection unit, into data that has been described in binary-data form that is a second data form; and a binary-data storage unit configured to store in a memory the data that has been described in the binary-data form obtained by the conversion by the data conversion unit.

Further, according to the present invention, there is provided with an information processing method for processing a structured document, comprising:

a reception step of receiving structured document data by receiving means;

a character-string detection step of detecting a character string, which is indicative of data that has been described in text-data form that is a first data form, contained in the structured document data;

a data conversion step of executing processing, in parallel with processing for receiving the structured document data, for converting data read in following the character string, which has been detected in the character-string detection step, into data that has been described in binary-data form that is a second data form; and a binary-data storage step of storing in a memory the data that has been described in the binary-data form obtained by the conversion at the data conversion step.

The features of the invention are achieved by a combination of the features set forth in the independent claims, while the dependent claims define specific advantageous examples of the invention.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail with reference to the accompanying drawings. It should be noted that the embodiments below do not limit the present invention set forth in the claims and that not all of the combinations of features described in the embodiments are necessarily essential as means for attaining the objects of the invention.

Figure 1:
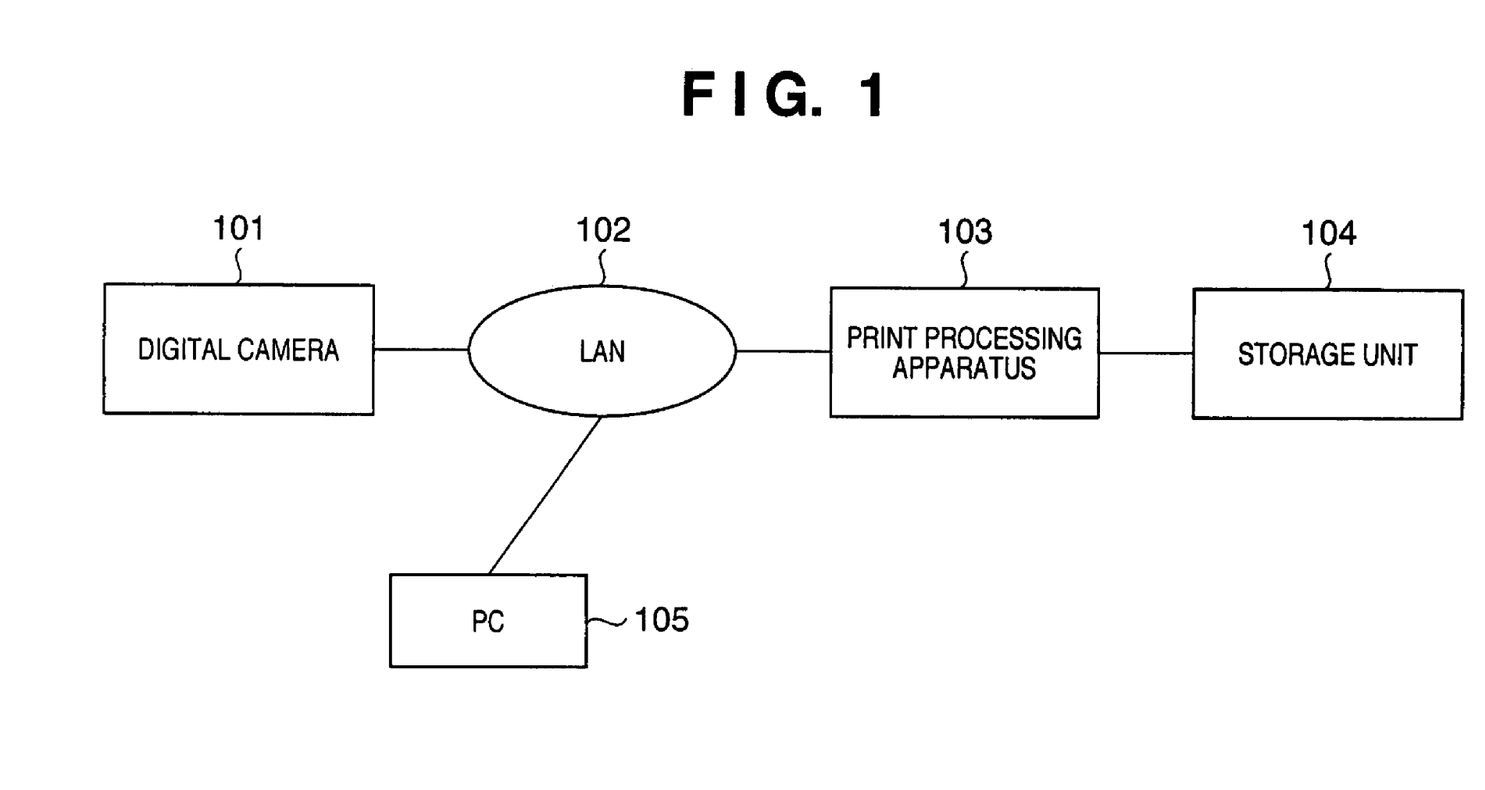
FIG. 1 is a diagram useful in describing an overview of a printing system that includes a print processing apparatus according to an embodiment of the present invention.

FIG. 1 is a diagram useful in describing an overview of a printing system that includes a print processing apparatus 103 according to an embodiment of the present invention.

As shown in FIG. 1, the print processing apparatus 103 is connected to a digital camera 101 and personal computer 105 via a LAN 102 and is capable of receiving structured document data such as XML document data from the digital camera 101 and personal computer 105 and of printing the documents on sheets of a printing medium. The LAN 102 can be replaced by another communication path such as a WAN or USB line. Further, the print processing apparatus 103 is connected via a USB line or SCSI to a storage unit 104 comprising a hard disk or the like for storing files such as document, image and audio data files. The personal computer 105, which is connected to the LAN 102, is capable of instructing the print processing apparatus 103 to print data via the LAN 102. Although the digital camera 101 and personal computer 105 are connected to the print processing apparatus 103 via the LAN 102 in FIG. 1, it goes without saying that other computer equipment and image input/output devices may also be connected.

Figure 2:
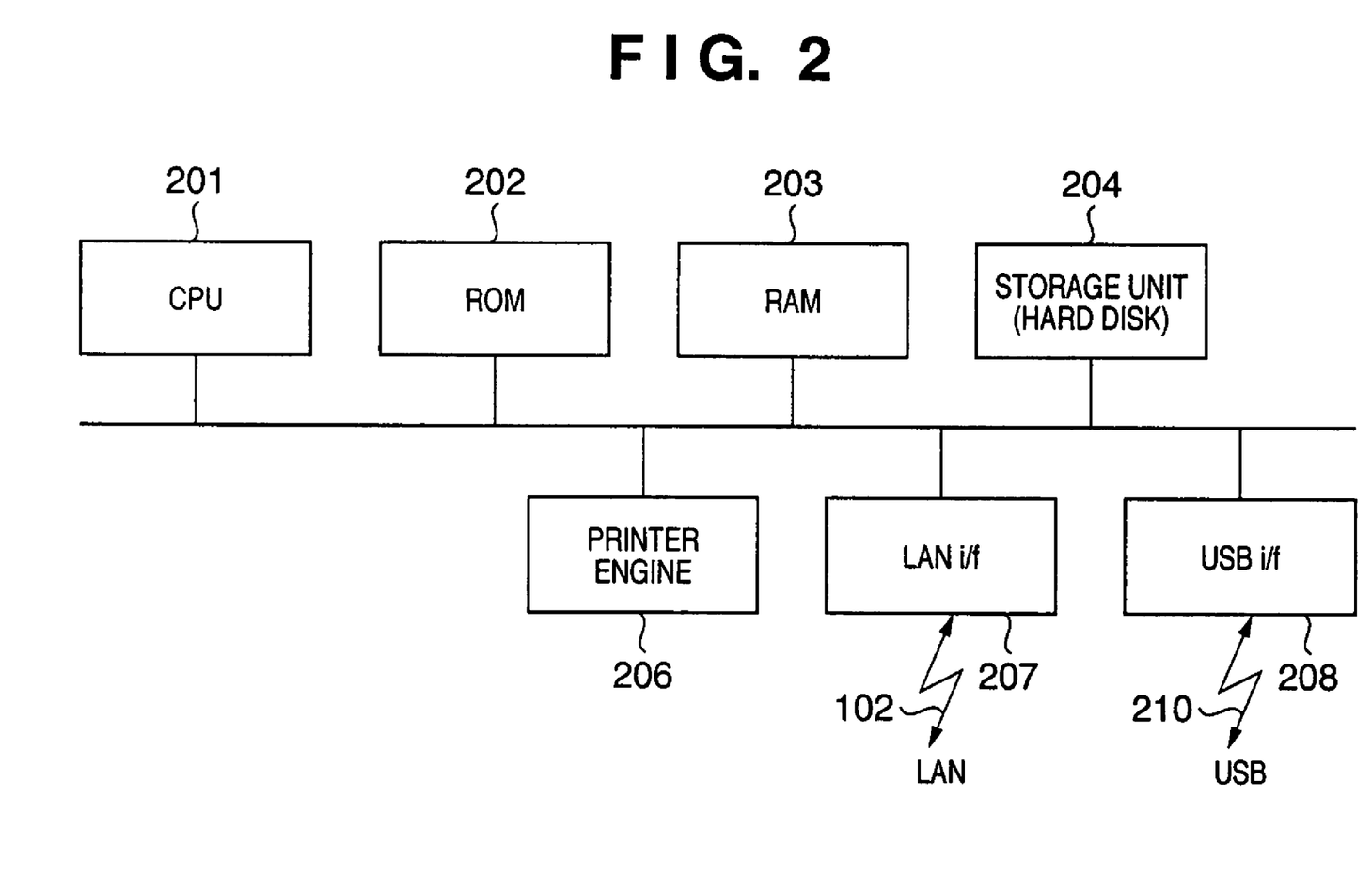
FIG. 2 is a block diagram for describing the hardware configuration of a print processing apparatus according to this embodiment.

FIG. 2 is a block diagram for describing the hardware configuration of the print processing apparatus 103 according to this embodiment.

A CPU 201 in FIG. 2 controls the overall operation of the apparatus 103 in accordance with a program that has been stored in a ROM 202. This processing includes also control for converting image data, which is contained in XML document data received from the digital camera 101 via the LAN 102, to print image data, outputting the print image data to a printer engine 206 and printing the image. The ROM 202 stores programs executed by the CPU 201 and various fixed data such as tables, described later. A RAM 203, which comprises an SRAM or DRAM, etc., stores various program control variables and the like when control processing is executed by the CPU 201. Various setting parameters and various working buffers also are stored in the RAM 203. The printer engine 206 prints images on sheets of a printing medium as by the ink-jet method or electro-photographic method. A LAN interface 207 is for connecting the print processing apparatus 103 to the LAN 102 and for receiving XML document data. A USB interface 208 is for connecting the print processing apparatus 103 to a USB 210. A scanner and modem, etc., may be added on depending upon the configuration of the print processing apparatus 103.

Described next will be operation when the print processing apparatus 103 according to this embodiment analyzes and processes a structured document (XML document data) received via the LAN 102. It should be noted that this embodiment imposes no particular restriction in relation to protocol when the structured document is sent.

First Embodiment

A first embodiment is characterized in that if a specific character string indicating the attribute type of a certain element has been detected at the beginning of the element, processing for converting the data form of the attribute data of an src attribute that corresponds to the specific character string of the element is executed in parallel with processing for receiving the data within the element by the LAN 207 and processing for analyzing the received data.

Figure 3:
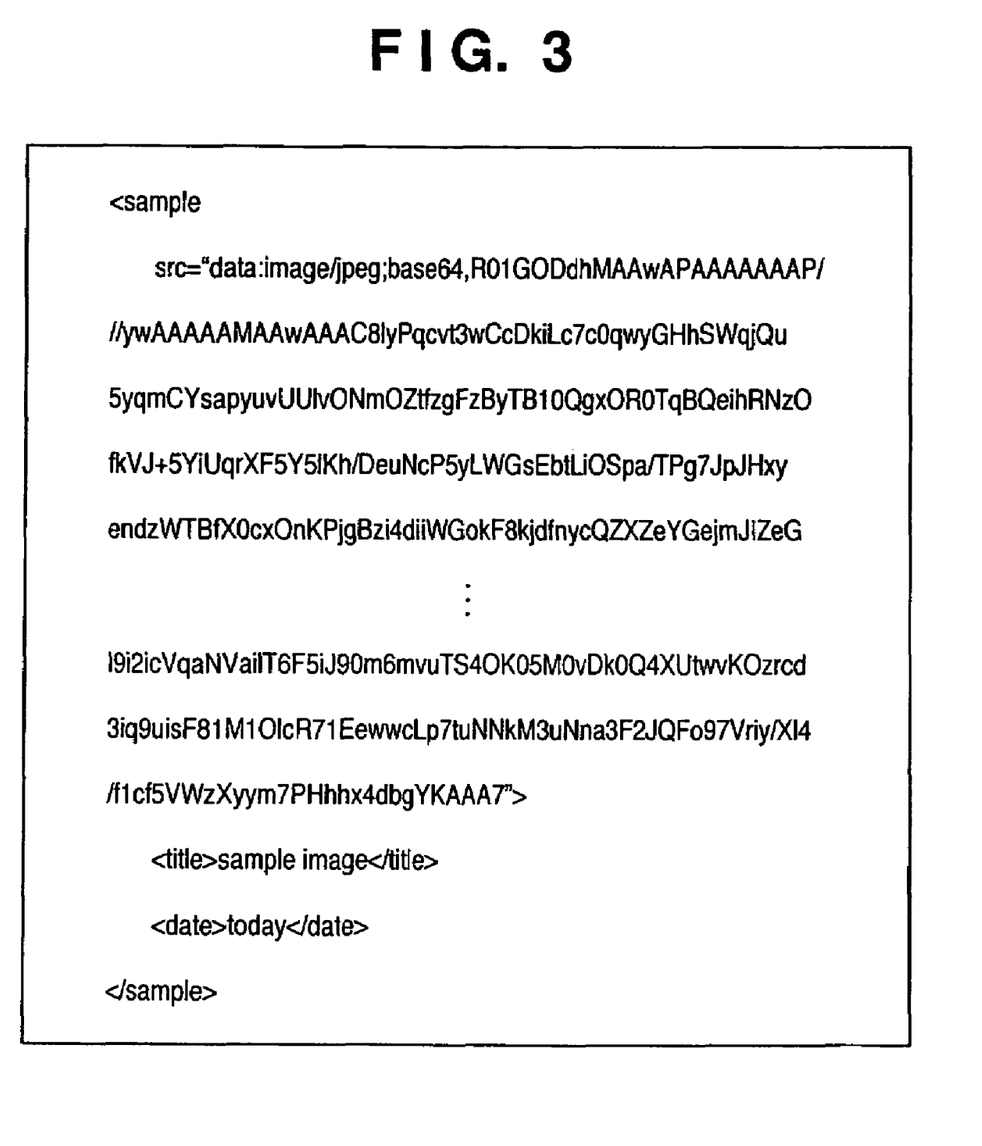
FIG. 3 is a diagram illustrating an example of a portion of document data received by a print processing apparatus according to a first embodiment of the present invention.

FIG. 3 is a diagram exemplifying a portion of document data received by the print processing apparatus 103 according to the first embodiment of the present invention.

The document data shown in FIG. 3 is described in XML. The print processing apparatus 103 detects "src="data:image/jpeg;base64", which is described in the first line of a sample element, thereby recognizing the fact that text data obtained by the base64 encoding of a jpeg image (binary data) is included as attribute data of an src attribute. This specific character string is followed by text data "ROIGOD . . . YKAAA7" obtained by base64 encoding (jpeg image data that has been base64 encoded and described by character code).

Figure 4:
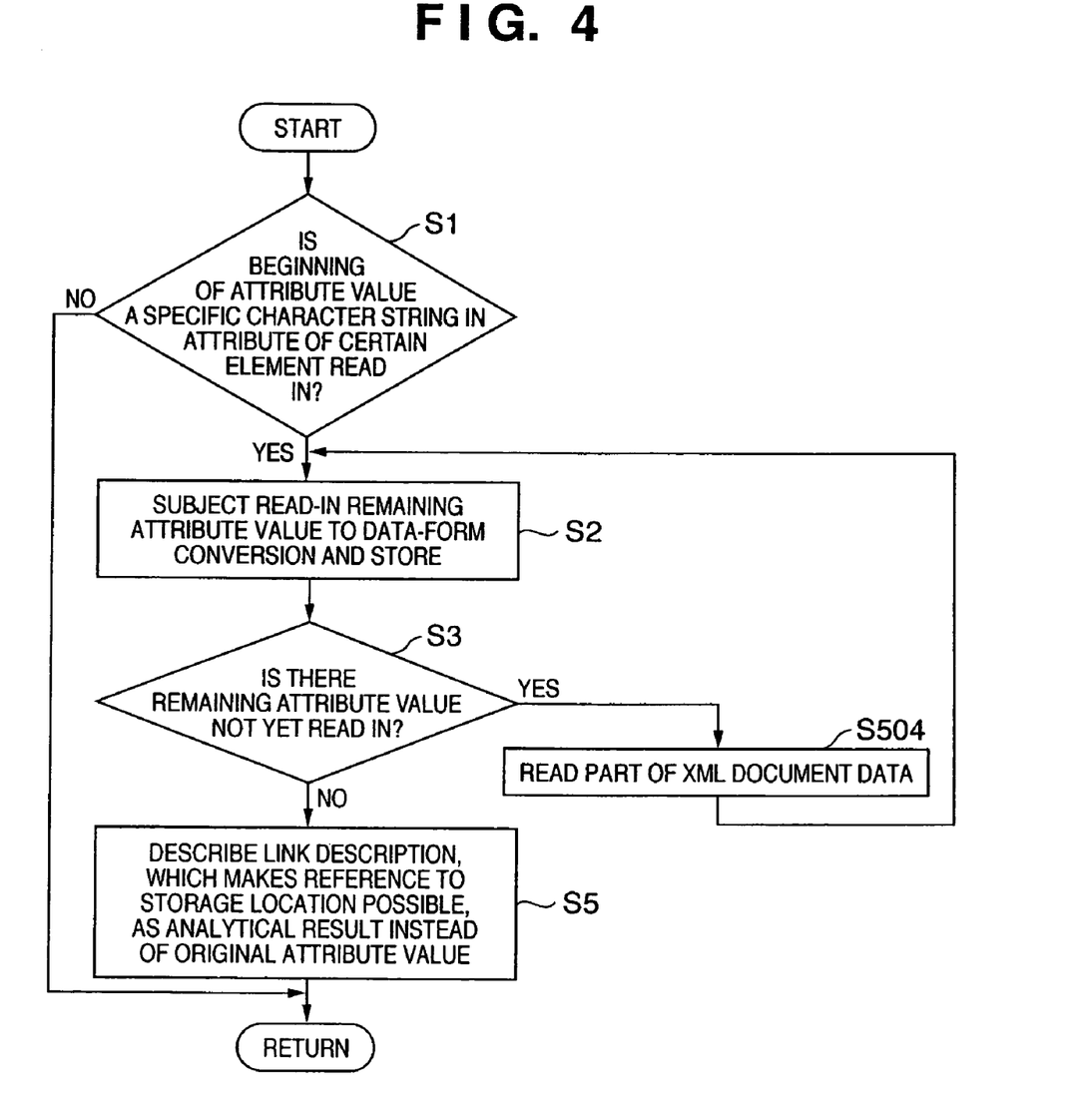
FIG. 4 is a flowchart for describing processing executed by the print processing apparatus according to the first embodiment.

FIG. 4 is a flowchart for describing processing executed by the print processing apparatus 102 according to the first embodiment. The program for executing this processing is stored in the ROM 202 and is executed under the control of the CPU 201. Here a case where a document of the kind shown in FIG. 3 has been received will be described.

The character string "data:image/jpeg;base64" at the beginning of the src attribute is in compliance with RFC 2397 of the IETF and is used in a case where data of a certain type is described in attribute data of the XML document data. Here "image/jpeg" indicates the data media type and is indicative of jpeg-encoded image data. Further, "base64" indicates the data encoding scheme. The print processing apparatus 103 according to the first embodiment reads in the successively received data contained the XML document data from the beginning thereof and executes analytical processing. In parallel with this reception processing, image data that has been described in the form of text data is converted to data in the form of binary data and an image in the form of this binary data obtained by the conversion is stored in the RAM 203. After these processing, processing for printing the stored image data is executed. Since the amount of binary data stored in the RAM 203 is made less than the amount of encoded text data contained in the XML document data, the RAM 203 need only have a small capacity.

First, in analytical processing executed in step S1 in FIG. 4, it is determined whether each element of the document data contains a specific character string (e.g., the above-mentioned character string "src="data:image/jpeg;base64") at the beginning of the element. If it is determined that the element does not contain the specific character string, processing is exited.

If it is determined in step S1 that the character string is included, then control proceeds to step S2. Here processing for reading in (receiving) attribute data of the src attribute that follows the specific character string and processing for analyzing the data is executed. In parallel with this processing, the data form (text data in the example cited above) of the attribute data read in is converted to another data form (binary data in the example cited above) and print processing is executed in the printer engine 206. In the first embodiment, the specific character string is assumed to be "data:image/ jpeg;base64". It should be noted that this specific character string indicates that the data is data that has been obtained by base64 encoding of jpeg-encoded image data.

In order that data size after conversion will be reduced, the conversion of data form is such that a conversion is made to binary-form data obtained by base64 decoding of data that has been base64 encoded. As a result, the amount of data is reduced to about three-fourths. The image data thus converted is subjected to print processing and may be stored as an image file in the external storage unit 104 connected to the print processing apparatus 103. In this case, identification information is generated and appended to the XML document data so that the storage location of the file can be searched. In the first embodiment, a URI of the file is generated as the identification information (identification data).

Next, in step S3, it is determined whether attribute data not yet read in exists. If attribute data still exists, this process returns to step S2, attribute data continues to be read in a manner similar to that set forth above, the data form is converted and the resultant data is stored in an image file. It should be noted that the XML document data to which identification information has been appended may also be stored in the storage unit 104.

It should be noted that base64 encoding is an operation that converts binary data into 64 types of ASCII characters. Each ASCII character used is expressed by six bits. That is, binary data of three bytes (24 bits) is converted to four ASCII characters. Although an ASCII character is composed of six valid bits, one byte (eight bits) is used to express each character. Binary data that was three bytes (24 bits), therefore, is encoded into data of four bytes (32 bits). Accordingly, the amount of data obtained by base 64 encoding shown in FIG. 3 has increased to an amount that is 4/3 times the amount of original binary data. By now decoding this data, the amount of data is reduced in the print processing apparatus 103.

When processing for analyzing the attribute data of all src attributes and print processing thus end in step S3, this process proceeds to step S4. Here processing is executed for describing the generated identification information in the XML document data as the analytical result instead of deleting the original base64-encoded attribute data. An extension describing link information (link data) that makes it possible to refer to the storage location of the decoded data is appended. As a result, data can be referred to as an external link of the XML document data. Further, by appending an appropriate extension, the content of the data can be judged based upon the extension.

The overall amount data can thus be reduced by the processing of steps S2 and S3. As a result, print processing can be executed even if the memory capacity of the RAM 203 is small. Further, in a case where print processing is executed again in the print processing apparatus 103, such repeating of print processing can be performed upon reading out the binary data by referring to the link information without executing data conversion processing again.

Figure 5:
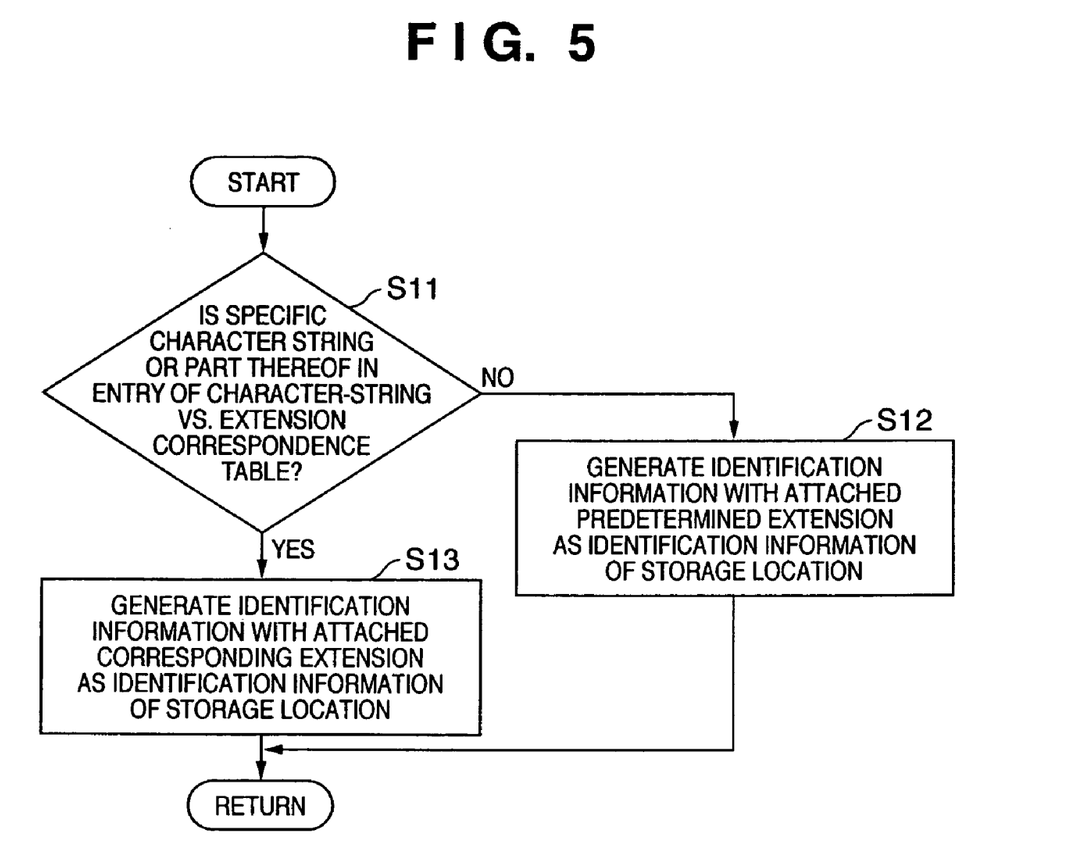
FIG. 5 is a flowchart useful in describing the details of processing for obtaining an optimum extension based upon a description of inputted document data in the processing of step S4 in FIG. 4.

FIG. 5 is a flowchart useful in describing the details of processing for obtaining an optimum extension based upon a description of inputted document data in the processing of step S4 in FIG. 4.

Figure 6:
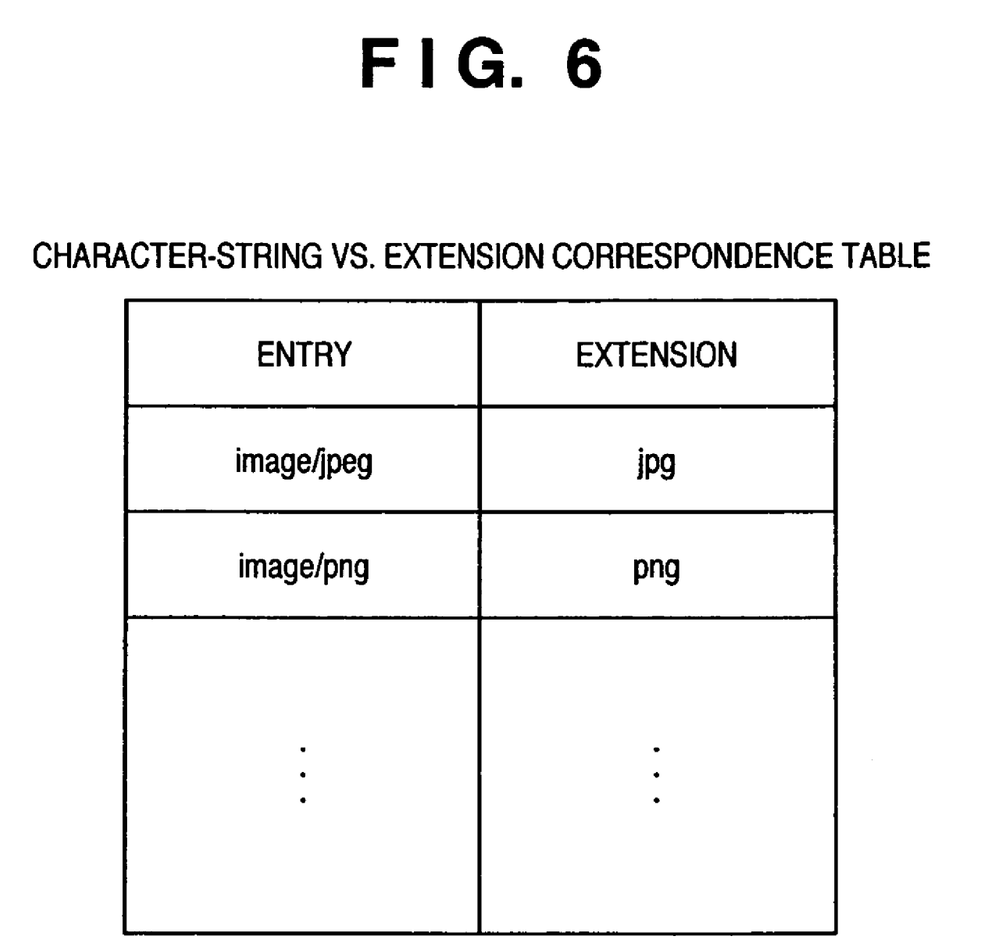
FIG. 6 is a diagram illustrating an example of a table that associates file extensions with character strings indicative of the extensions contained in inputted document data.

Here a table of the kind shown in FIG. 6 for associating extensions with character strings is prepared.

FIG. 6 illustrates an example of a correspondence table. Specifically, in a case where data that has undergone a conversion of data form is stored as a file, the table associates the extension of this file with a character string that indicates the extension contained in the document data that has been input. This table is stored in the ROM 202, by way of example. In the illustrated example, "image/jpeg" has been associated with the extension "jpg".

At step S11 in FIG. 5, it is determined, when attribute data is stored, whether the character string of an entry in the character-string vs. extension correspondence table of FIG. 6 is contained in the specific character string that is detected at step S1. If the character string is not contained in the specific character string, control proceeds to step S12 where a predetermined extension is appended and stored. If the character string is contained in the specific character string, however, this process proceeds to step S13. Here the extension that corresponds to the character string indicative of this extension is appended and stored with reference to the table of FIG. 6.

In the case of the first embodiment, the character string "image/jpeg" of the extension is contained in the specific character string, as shown in FIG. 3, and therefore the extension "jpeg" corresponding to this is appended and stored with reference to the table of FIG. 6. Further, the method of converting the form of data also can be selected appropriately based upon the document data that has been inputted.

Figure 7:
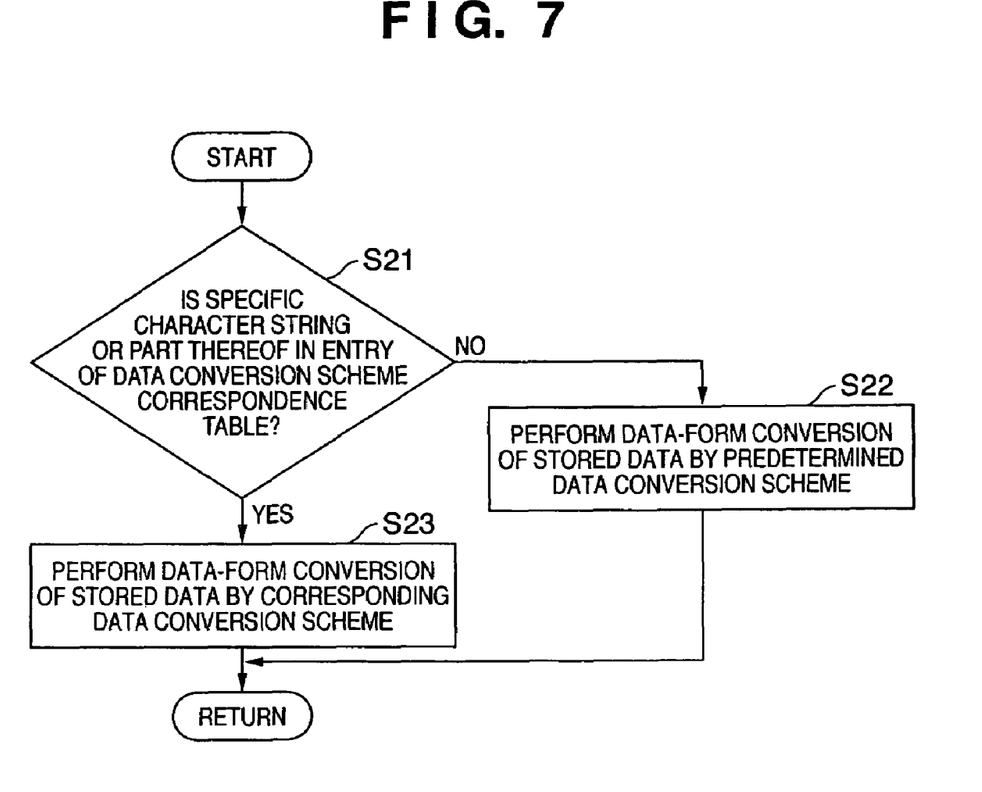
FIG. 7 is a flowchart illustrating an operation for selecting an appropriate conversion scheme based upon a description of inputted document data when the form of data is converted in step S2 of FIG. 4 in the first embodiment.

FIG. 7 is a flowchart illustrating an operation for selecting an appropriate conversion scheme based upon a description of inputted document data when the form of data is converted at step S2 of FIG. 4 in the first embodiment.

Figure 8:
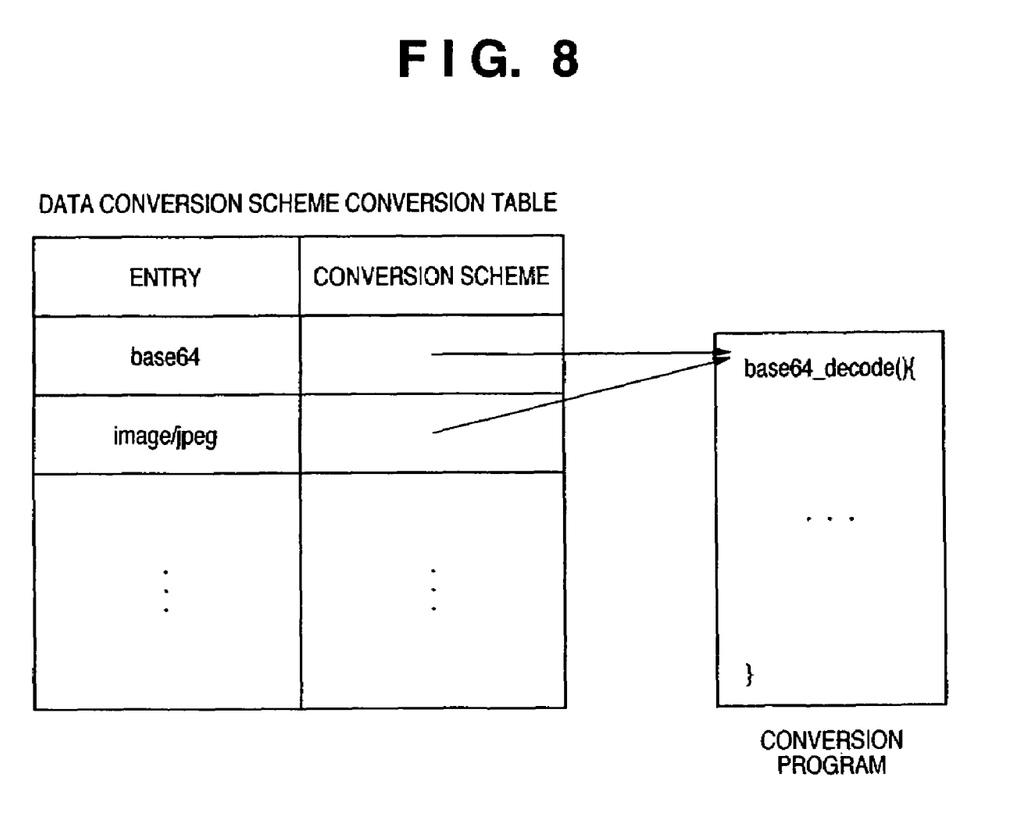
FIG. 8 is a diagram useful in describing an example of a table that describes into what form of data a conversion is made when the form of data is converted.

A table that associates entries and data conversion schemes shown in FIG. 8 is prepared in advance.

FIG. 8 is a diagram illustrating an example of a table that describes into what form of data a conversion is made when the form of data is converted. This table is stored in, e.g., the ROM 202. In this example, "base64" has been associated in such a manner that it will be converted to base64 decode "base64_decode".

When the data form of attribute data is converted in step S2 in FIG. 4, it is determined at step S21 in FIG. 7 whether an identification character string of a conversion scheme in an entry in the data conversion scheme correspondence table of FIG. 8 is contained in the specific character string that is detected at step S1. If the identification character string is not contained in the specific character string, this process proceeds to step S22 where the data form is converted by a predetermined data conversion scheme. If the identification character string is contained in the specific character string, however, control proceeds to step S23. Here a conversion is made to the corresponding data form with reference to the table of FIG. 8.

In the first embodiment, the character string "base64" of the extension is contained in the specific character string and therefore the form of the data is converted by "base64_decode( ){" (base64 decode). That is, text data that has been base64 encoded is decoded to binary data.

In the first embodiment, as described above, jpeg image data that has been encoded by "data:image/jpeg;base64" of the src attribute is converted to data of binary form and stored, and the jpeg data is stored as a file. As a result, the amount of data in the original document data can be reduced. Furthermore, a URI indicating the file that has been stored is described in the XML document data instead of the jpeg image data that has been encoded by "data:image/jpeg;base64". As a result, the stored data can be accessed based upon this URI in a subsequent process. Thus, print processing can be executed even with a small-capacity memory.

Second Embodiment

Described next in a second embodiment of the present invention is a case where, when a specific character string described in a start tag of a certain element has been detected as attribute type information in a description format shown in FIG. 9, the form of the data described as the content of the element is converted to another form in parallel with read-out of the attribute value and print processing is executed. It should be noted that the hardware configurations of the print system and print processing apparatus 103 according to the second embodiment are similar to those of the first embodiment and need not be described again.

Figure 9:
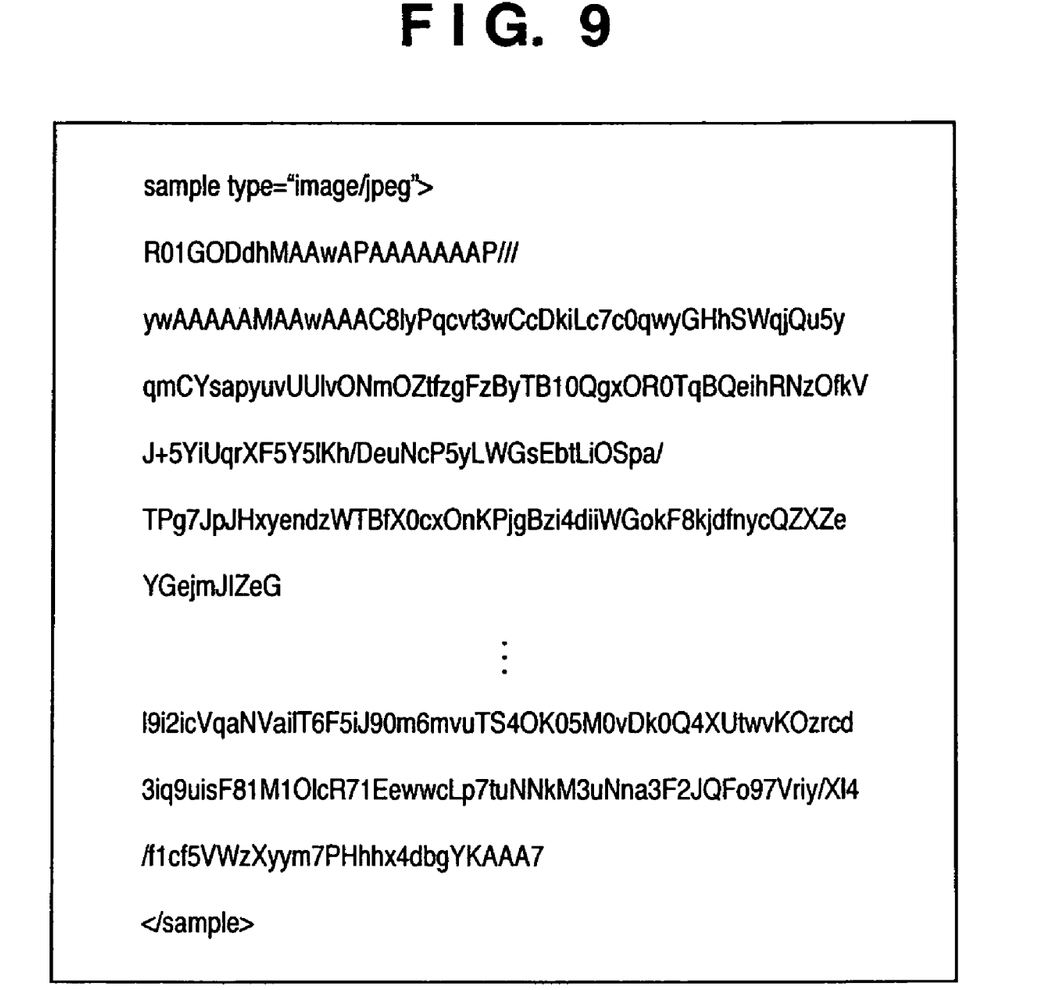
FIG. 9 is a diagram illustrating an example of a portion of document data received by a print processing apparatus according to a second embodiment of the present invention.

FIG. 9 is a diagram exemplifying a portion of document data received by the print processing apparatus 103 according to a second embodiment of the present invention.

The document is described in XML, as illustrated in FIG. 9. Here a character string (type="image/jpeg") representing a media type "image/jpeg" is described as an element type attribute (information indicating the type of element).

Figure 10:
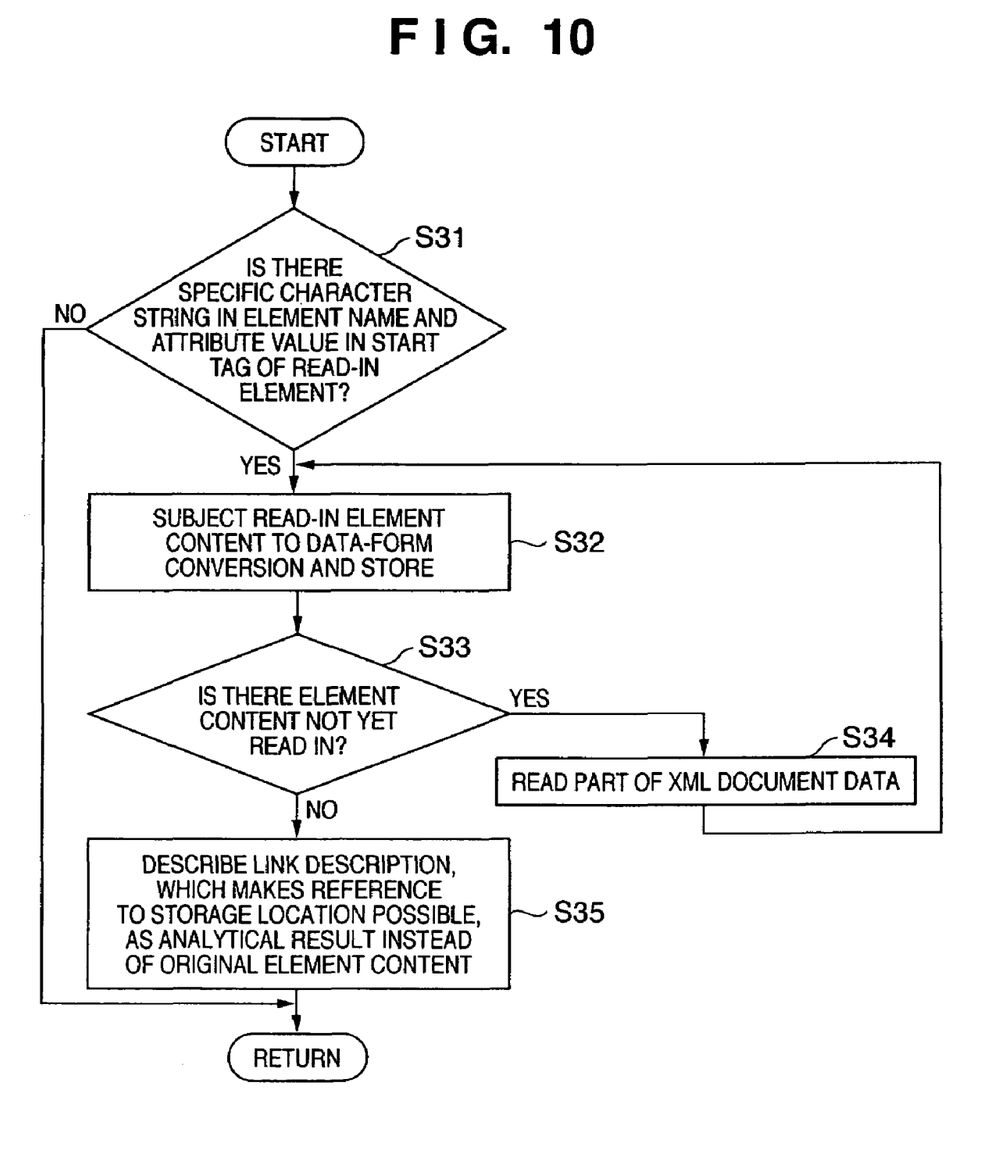
FIG. 10 is a flowchart for describing processing in the print processing apparatus according to the second embodiment.

FIG. 10 is a flowchart for describing processing in the print processing apparatus 103 according to the second embodiment. The program for executing this processing is stored in the ROM 202 and is executed under the control of the CPU 201. As in the first embodiment, the print processing apparatus 103 according to the second embodiment successively accepts the received XML document data from the beginning thereof, reads in the document data and executes analytical processing.

First, in analytical processing executed in step S31 in FIG. 10, it is determined whether a prescribed type attribute "image/jpeg" is described in the attribute of each element. If it is determined that the prescribed type attribute is not described, analytical processing is exited.

If it is determined in step S31 that the prescribed type attribute is described, then control proceeds to step S32, where processing for receiving and analyzing the content of the element is executed. Furthermore, in parallel with this processing, element content is successively converted to another data form and print processing is executed. The conversion of the form of data is similar to that of the first embodiment. Specifically, in order that the data size will be reduced, base64 decoding is executed in case of base64-encoded data. Storage of the data after conversion also is similar to that of the first embodiment, with the data being stored in the storage unit 104 as a file. In the second embodiment also, identification information is generated and appended at the time of storage so that the reference can be had to the storage location. According to the second embodiment, the data is stored in the storage unit 104 as a file and a URI is appended thereto and stored as the identification information.

Following such storage, it is determined in step S33 whether content of a remaining element not yet read in exists in the document data. If such content exists, control returns to step S32, data conversion processing is executed as described above and print processing is executed based upon the image data obtained by the conversion. It should be noted that an optimum extension can be included, based upon the description of the inputted document data, as identification information of the storage location of the converted image data in a manner similar to that of the first embodiment. If the content of all elements is thus stored at step S33, then control proceeds to step S34. Here the generated identification information is described as the analytical result instead of the original element content.

Figure 11:
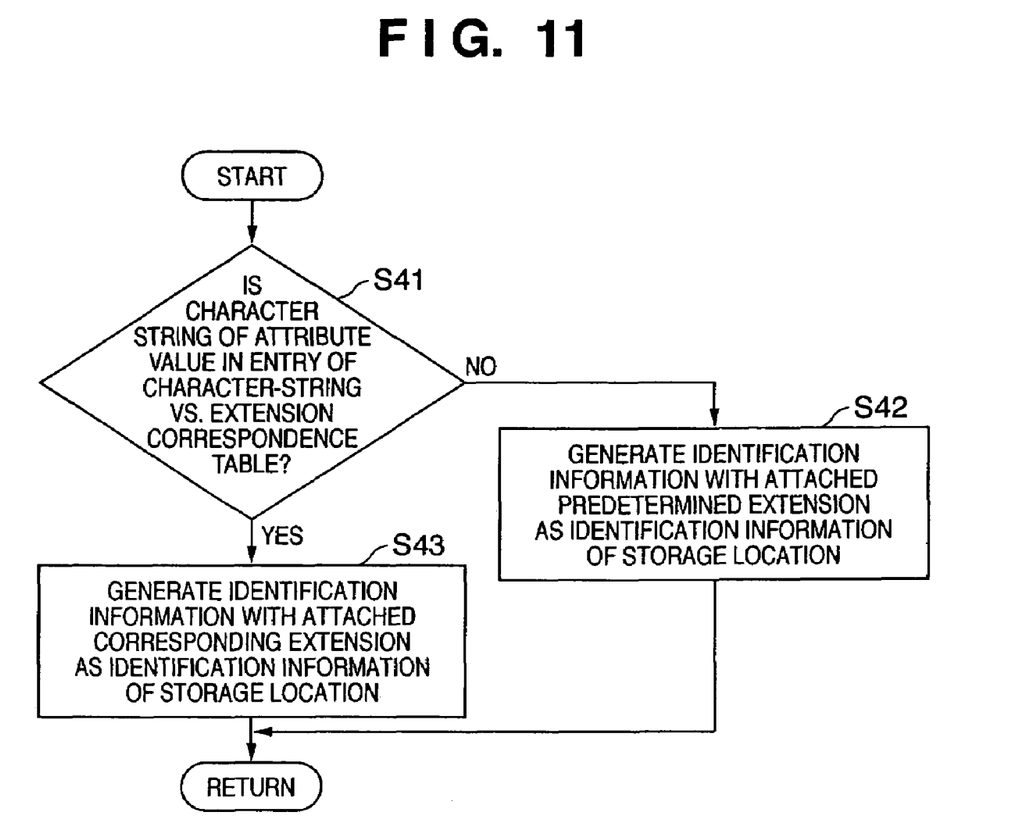
FIG. 11 is a flowchart useful in describing the details of processing for including an optimum extension based upon a description of inputted document data in the processing of step S34 in FIG. 10.

FIG. 11 is a flowchart useful in describing the details of processing for including an optimum extension based upon a description of inputted document data in the processing of step S34 in FIG. 10.

Here the table of the kind shown in FIG. 6 for associating extensions with character strings is prepared.

At step S41 in FIG. 11, it is determined, when the content of an element is stored in step S32 in FIG. 10, whether the identification character string of an extension in an entry in the character-string vs. extension correspondence table of FIG. 6 is contained in the description in the same element. If the identification character string is not contained in the description, control proceeds to step S42 where a predetermined extension is appended and the data obtained by the conversion is stored. On the other hand, if it is determined in step S41 that the identification character string is contained in the entry, control proceeds to step S43. Here reference is had to the table of FIG. 6 and the corresponding extension is appended and stored.

In the case of the second embodiment, the character string "image/jpeg" is contained in the value of the type attribute of the same element and therefore the extension "jpeg" is appended and stored.

Further, the method of converting the form of data also can be selected appropriately based upon the document data that has been inputted.

Figure 12:
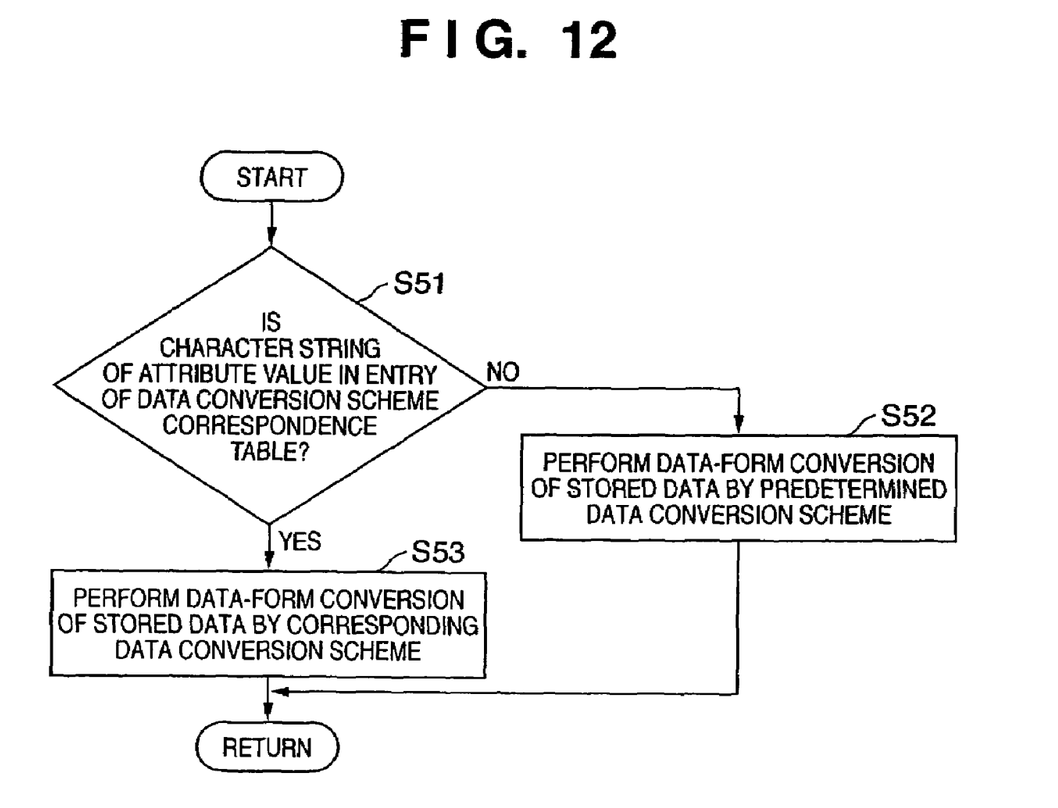
FIG. 12 is a flowchart illustrating an operation for selecting an appropriate conversion scheme based upon a description of inputted document data when the form of data is converted in step S32 of FIG. 10 in the second embodiment.

FIG. 12 is a flowchart illustrating an operation for selecting an appropriate conversion scheme based upon a description of inputted document data when the form of data is converted in step S32 of FIG. 10 in the second embodiment. In this case also a table of the kind shown in FIG. 8 that associates entries and data conversion schemes is prepared in advance.

At step S51 in FIG. 12, it is determined, when the content of an element is subjected to a form conversion at step S32, whether the identification character string of a conversion scheme in an entry in the data conversion scheme correspondence table of FIG. 8 is contained in the description in the same element. If the identification character string is not contained in the description, control proceeds to step S52 where the data form is converted by a predetermined scheme. If the identification character string is contained in the specific character string, however, control proceeds to step S53. Here the data form is converted by the corresponding scheme in accordance with the table of FIG. 8.

In the case of the second embodiment, the character string "image/jpeg" is contained in the value of the type attribute of the same element and therefore the data form is converted by base64 decode. In general, whether data has been base64 encoded or not cannot be determined merely by the media type "image/jpeg". However, the appropriate data conversion scheme can be recognized by deciding the data conversion scheme corresponding to the character string "image/jpeg" in the correspondence table.

Thus, in accordance with the second embodiment as described above, a newly generated URI is described instead of content from a start tag to an end tag of a sample element. This is followed by proceeding with analytical processing and outputting the results of analysis in units of structure of the document data. The file data that has been stored can be accessed by obtaining the URI that has been appended to this file.

Although the first and second embodiments set forth above have been described taking a print processing apparatus as an example, the present invention is not limited to such an apparatus and can be applied similarly to, e.g., a mobile telephone, display and storage units and other peripherals, and a general-purpose information processing apparatus such as a computer.

By way of example, the invention is also applicable to an audio reproduction apparatus. More specifically, in parallel with read-out of text data that has been described by base64 encoding in XML document data, the data is converted to audio data in binary form and the audio data obtained by the conversion is reproduced or stored.

The embodiments described above are such that in parallel with processing for receiving data in a document in accordance with detection of a specific character string in the document data, the data can be converted to data in a form having a smaller data size, print processing can be executed and the data can be stored in a file.

Further, in accordance with the embodiments, even if a large amount of data such as image data is contained in units of structure of inputted document data, the data can be processed effectively even with devices of limited resources such as memories. Further, since the input/output interfaces are of the conventional type, support cost on the side of an application that applies the embodiments can be reduced.

There are cases where the object of the invention is attained also by supplying a software program, which implements the functions of the foregoing embodiments, directly or remotely to a system or apparatus, reading the supplied program codes with a computer of the system or apparatus, and then executing the program codes. In this case, so long as the system or apparatus has the functions of the program, the mode of implementation need not rely upon a program. Accordingly, since the functional processing of the present invention is implemented by computer, the program codes per se installed in the computer also implement the present invention. In other words, the present invention also covers a computer program that is for the purpose of implementing the functional processing of the present invention. In this case, so long as the system or apparatus has the functions of the program, the form of the program, e.g., object code, a program executed by an interpreter or print data supplied to an operating system, etc., does not matter.

Examples of storage media that can be used for supplying the program are a Floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc. As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

The present invention is not limited to the above embodiments and various changes and modifications can be made within the spirit and scope of the present invention. Therefore, to apprise the public of the scope of the present invention, the following claims are made.

This application claims the benefit of Japanese Application No. 2005-091856, filed on Mar. 28, 2005, which is hereby incorporated by reference herein in its entirety.

What is claimed is:

1. An information processing apparatus for processing structured document data, comprising:

storing means for storing a table describing a correspondence between a conversion scheme for converting embedded text data described in a text-data form into binary data described in a binary-data form and a character string;

reception means for receiving the structured document data which comprises a plurality of items of the embedded text data, each item of the embedded text data being associated with the character string, the embedded text data described in the text-data form originating from the binary data described in the binary-data form;

character-string detection means for detecting the character string to identify the embedded text data within the received structured document data;

data conversion means for converting the identified embedded text data described in the text-data form into the binary data described in the binary-data form that has a data amount smaller than that of the embedded text data, the conversion being conducted according to the conversion scheme specified by the detected character string with reference to the table, and storing the converted binary data independently of the structured document data, and replacing means for replacing, in the received structured document data, the embedded text data described in the text-data form with link information to the converted binary data.

2. The apparatus according to claim 1, wherein the data conversion means converts other embedded text data which is not associated with the character string using a predetermined conversion scheme.

3. The apparatus according to claim 1, wherein the binary data is stored in a binary data storage unit external to the information processing apparatus.

4. The apparatus according to claim 3, wherein the data conversion means stores the binary data with an extension corresponding to the character string.

5. The apparatus according to claim 1, wherein the information processing apparatus is a printing device.

6. The apparatus according to claim 1, wherein the structured document data is XML.

* * * * *